(12) United States Patent
Ni et al.

(10) Patent No.: US 12,452,975 B2
(45) Date of Patent: Oct. 21, 2025

(54) LED DRIVING CIRCUIT AND METHOD FOR CONTROLLING A CURRENT DISTRIBUTION TO AN LED STRING

(71) Applicant: Monolithic Power Systems, Inc., Kirkland, WA (US)

(72) Inventors: Chia-Lung Ni, New Taipei (TW); Zheng Luo, San Jose, CA (US); Yu-Huei Lee, New Taipei (TW); Junjian Zhao, San Jose, CA (US)

(73) Assignee: Monolithic Power Systems, Inc., Kirkland, WA (US)

( * ) Notice: Subject to any disclaimer, the term of this patent is extended or adjusted under 35 U.S.C. 154(b) by 181 days.

(21) Appl. No.: 18/343,446

(22) Filed: Jun. 28, 2023

(65) Prior Publication Data

US 2023/0397311 A1    Dec. 7, 2023

(51) Int. Cl.
*H05B 45/30* (2020.01)
*H05B 45/345* (2020.01)
*H05B 45/395* (2020.01)
*H05B 45/46* (2020.01)

(52) U.S. Cl.
CPC ......... *H05B 45/345* (2020.01); *H05B 45/395* (2020.01); *H05B 45/46* (2020.01)

(58) Field of Classification Search
CPC ........ H05B 45/10; H05B 45/14; H05B 45/20; H05B 45/24; H05B 45/30; H05B 45/34; H05B 45/345; H05B 45/395; H05B 45/40; H05B 45/44; H05B 45/46

See application file for complete search history.

(56) References Cited

U.S. PATENT DOCUMENTS 11,849,514 B1 * 12/2023 Montoncelli .......... H05B 45/35
2014/0241387 A1 * 8/2014 Ortiz ..................... H01S 3/0912
372/38.02

* cited by examiner

*Primary Examiner* — Long Nguyen
(74) *Attorney, Agent, or Firm* — Perkins Coie LLP

(57) ABSTRACT

LED driving circuit includes a first current source, a second current source, a current sensing circuit, and a control circuit. The first current source, coupled in series with a heat dissipation resistor, provides a first current path to the LED string. The second current source, coupled in parallel with the serially coupled first current source and the heat dissipation resistor, provides a second current path to the LED string. The current sensing circuit is configured to sense a current sense signal representing a current flowing through the LED string. The control circuit is configured to control a current distribution of the first current path and a second current path in response to the current sense signal. When the current sense signal is greater than a threshold, a current flowing through the first current path is larger than a current flowing through the second current path.

19 Claims, 8 Drawing Sheets

LED DRIVING CIRCUIT AND METHOD FOR CONTROLLING A CURRENT DISTRIBUTION TO AN LED STRING

TECHNICAL FIELD

The present disclosure relates generally to power circuits, and more particularly but not exclusively to LED driving circuits.

BACKGROUND OF THE INVENTION

LED driving circuits are often used to supply current to a string of LEDs for brightness control. The heat management of the LED driving circuit is an important issue especially when the input voltage is high and the output voltage is low. The excess power results in overheating of the LED driver, which may damage the driving circuits. A typical solution is to use an external resistor to solve the thermal problem. Via the external resistor located outside of the LED driver IC, the power is dissipated and thus the voltage across the IC is limited. However, the external resistor will limit the LED current. For instance, when the value of the input voltage is too low, the IC or the LED may not work properly due to the low current. Therefore, it is desirable to solve the thermal problem and further provide the target LED current for a wide range of input voltage.

SUMMARY OF THE INVENTION

According to an embodiment of the present disclosure, an LED driving circuit is provided. LED driving circuit includes a first current source, a second current source, a current sensing circuit, and a control circuit. The first current source, coupled in series with a heat dissipation resistor, is configured to provide a first current path to the LED string. The second current source, coupled in parallel with the serially coupled first current source and the heat dissipation resistor, is configured to provide a second current path to the LED string. The current sensing circuit is configured to sense a current sense signal representing a current flowing through the LED string. The current flowing through the LED string is supplied by the first current path and the second current path. The current flowing through the LED string is supplied by the first current path and the second current path. The control circuit is configured to receive the current sense signal, and control a current distribution of the first current path and a second current path in response to the current sense signal. When the current sense signal is greater than a threshold, a current flowing through the first current path is larger than a current flowing through the second current path. When the current sense signal is less than the threshold, the current flowing through the first current path is less than the current flowing through the second current path.

According to another embodiment of the present disclosure, a method for driving an LED string is provided. The method includes the following actions. A first current path to the LED string is provided through a heat dissipation resistor. A second current path, in parallel with the first current path, to the LED string is provided. A current sense signal representing a current flowing through the LED string is sensed, where the current flowing through the LED string is supplied by the first current path and the second current path. A current distribution of the first current path and a second current path is controlled in response to the current sense signal.

According to yet another embodiment of the present disclosure, an LED driving circuit for driving an LED string is provided. The LED driving circuit includes a first switch, a second switch, a current sensing circuit, and a control circuit. The first switch is coupled in series with a heat dissipation resistor, and the first switch is configured to provide a first current path to the LED string. The second switch is coupled in parallel with the serially coupled first switch and the heat dissipation resistor, and the second switch is configured to provide a second current path to the LED string. The current flowing through the LED string is supplied by the first current path and the second current path. The current sensing circuit is configured to detect a voltage across a current sense resistor. The control circuit is configured to receive the voltage across the current sense resistor, and provide a first control signal to a control terminal of the first switch and a second control signal to a control terminal of the second switch in response to the voltage across the current sense resistor. When the voltage across the current sense resistor is not greater than a reference, the second switch is turned on to provide the current flowing through the LED string via the second current path.

BRIEF DESCRIPTION OF THE DRAWINGS

The present disclosure can be further understood with reference to the following detailed description and appended drawings, wherein like elements are provided with like reference numerals. These drawings are only for illustration purpose, thus may only show part of the devices and are not necessarily drawn to scale.

DETAILED DESCRIPTION

Various embodiments of the present disclosure will now be described. In the following description, some specific details, such as example circuits and example values for these circuit components, are included to provide a thorough understanding of embodiments. One skilled in the relevant art will recognize, however, that the present disclosure can be practiced without one or more specific details, or with other methods, components, materials, etc. In other instances, well-known structures, materials, processes or operations are not shown or described in detail to avoid obscuring aspects of the present disclosure.

Throughout the specification and claims, the phrases "in one embodiment", "in some embodiments", "in one implementation", and "in some implementations" as used includes both combinations and sub-combinations of various features described herein as well as variations and modifications thereof. These phrases used herein do not necessarily refer to the same embodiment, although it may. Those skilled in the art should understand that the meanings of the terms identified above do not necessarily limit the terms, but merely provide illustrative examples for the terms. It is noted that when an element is "connected to" or "coupled to" the other element, it means that the element is directly connected to or coupled to the other element, or indirectly connected to or coupled to the other element via another element. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Figure 1:
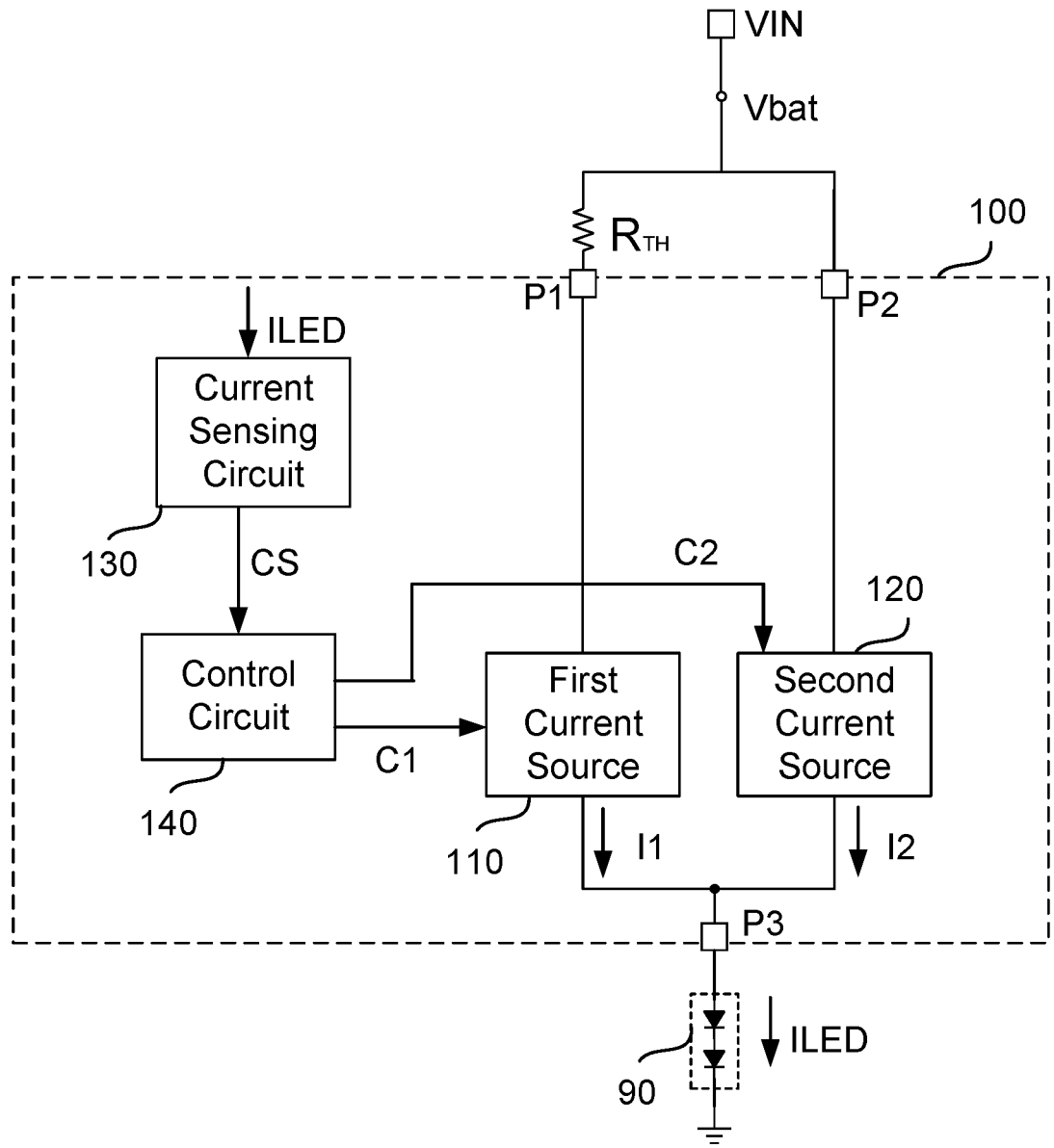
FIG. 1 is a schematic block diagram of an LED driving circuit for driving an LED string in accordance with an embodiment of the present disclosure.

FIG. 1 is a schematic block diagram of an LED driving circuit 100 for driving an LED string 90 in accordance with an embodiment of the present disclosure. The LED driving circuit 100 includes a first current source 110, a second current source 120, a current sensing circuit 130, and a control circuit 140.

The first current source 110 is coupled in series with a heat dissipation resistor $R_{TH}$. The first current source 110 is configured to provide a first current path I1 to the LED string 90. The second current source 120 is coupled in parallel with the serially coupled first current source 110 and the heat dissipation resistor $R_{TH}$. The second current source 120 is configured to provide a second current path I2 to the LED string 90.

In one embodiment, the LED driving circuit 100 is an integrated circuit (IC), and the heat dissipation resistor $R_{TH}$ is arranged outside of the IC for heat dissipation. In the embodiment of FIG. 1, the heat dissipation resistor $R_{TH}$ is arranged between the power supply node Vbat and the pin P1, and the LED string 90 is arranged outside of the IC (e.g., the pin P3). It should be noted that the arrangement of IC, the heat dissipation resistor $R_{TH}$, and the LED string 90 may be different. For instance, the LED string 90 may be arranged on the high side between the power supply node Vbat and the heat dissipation resistor $R_{TH}$. On the other hand, the heat dissipation resistor $R_{TH}$ may be arranged on the low side between the pin p3 and the LED string 90.

The current sensing circuit 130 is configured to sense a current sense signal CS representing a current flowing through the LED string 90 (i.e., ILED). As shown in FIG. 1, the current ILED flowing through the LED string 90 is supplied by the first current path I1 and the second current path I2.

The control circuit 140 is configured to receive the current sense signal CS, and control the current distribution of the first current path I1 and a second current path I2 in response to the current sense signal CS.

Figure 2A:
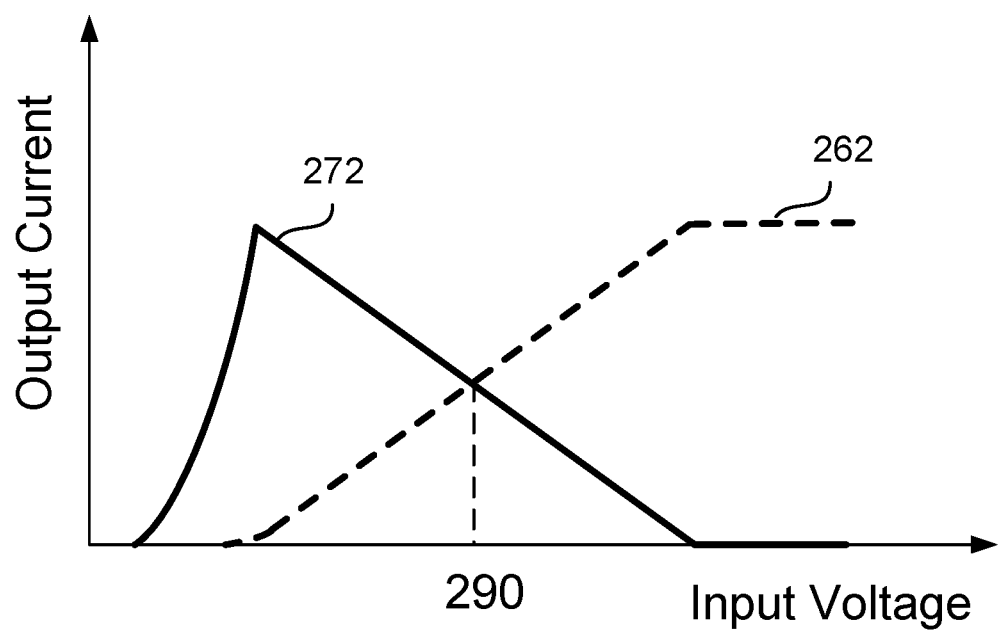
FIGS. 2A-2D shows several examples of a current distribution of the first current path and a second current path of the LED driving circuit in accordance with an embodiment of the present disclosure.

FIG. 2A shows an example of a current distribution of the first current path I1 and a second current path I2 of the LED driving circuit 100 as shown in FIG. 1, in accordance with an embodiment of the present disclosure. As shown in FIG. 2A, the x-axis represents the input voltage via input pin VIN and the y-axis represents the output current, where the curve 262 shows the current flowing through the first current path I1, and the curve 272 shows the current flowing through the second current path I2.

In order to satisfy the target LED current even when the input voltage is low, most of the current will flow through the second current path I2 (i.e., the curve 272 in FIG. 2A). As the input voltage rises, the current flowing through the first current path I1 (i.e., the curve 262 in FIG. 2A) gradually increases to reduce the heat and loss on the IC via the heat dissipation resistor $R_{TH}$. When the input voltage is greater than a threshold 290, most of the LED current will flow through the first current path I1 via the heat dissipation resistor $R_{TH}$.

In one embodiment, the threshold 290 is determined according to the current sense signal CS. For instance, when the current sense signal CS is greater than a threshold $CS_{th}$, a current flowing through the first current path I1 is larger than a current flowing through the second current path I2 as shown in the right part of the curves 262 and 272. When the current sense signal CS is less than the threshold $CS_{th}$, the current flowing through the first current path I1 is less than the current flowing through the second current path I2 as shown in the left part of the curves 262 and 272.

Figure 2B:
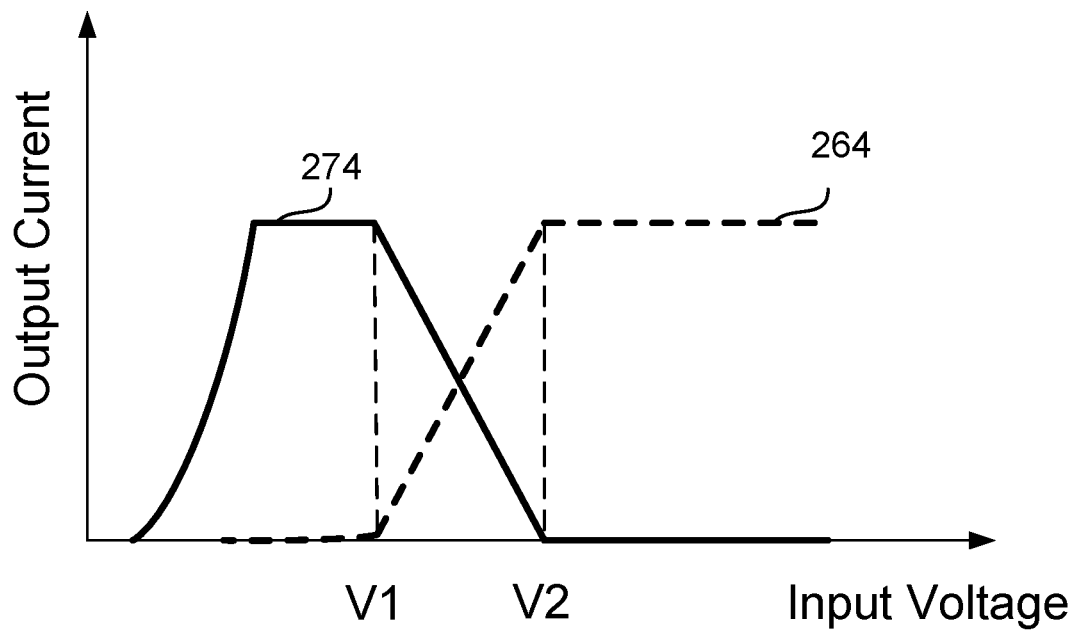

FIG. 2B shows an example of a current distribution of the first current path I1 and a second current path I2 of the LED driving circuit 100 in accordance with another embodiment of the present disclosure. In this embodiment, when the input voltage from the pin VIN is greater than the reference voltage V2, the control circuit 140 regulates the LED current via the first current path as shown in the right part of the curve 264. When the input voltage from the pin VIN is less than the reference voltage V1, the control circuit 140 regulates the LED current via the second current path as shown in the left part of the curve 274. When the input voltage from the pin VIN between the reference voltage V1 and the reference voltage V2, the control circuit 140 regulates the LED current via both the first current path and the second current path as shown in the middle part of the curves 264 and 274.

Figure 2C:
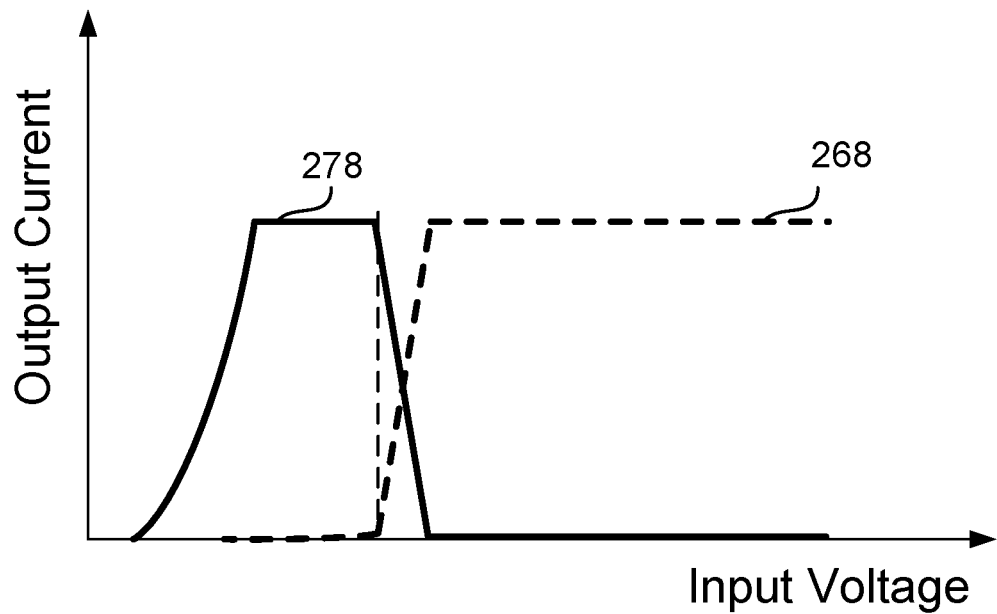

FIG. 2C shows an example of a current distribution of the first current path I1 and a second current path I2 of the LED driving circuit 100 in accordance with yet another embodiment of the present disclosure. In this embodiment, the control circuit 140 regulates the LED current via only one current path. That is, when the LED current is supplied via the first current path, that is the first current is greater than zero, there is not current generated via the second current path; and vice versa.

Figure 2D:
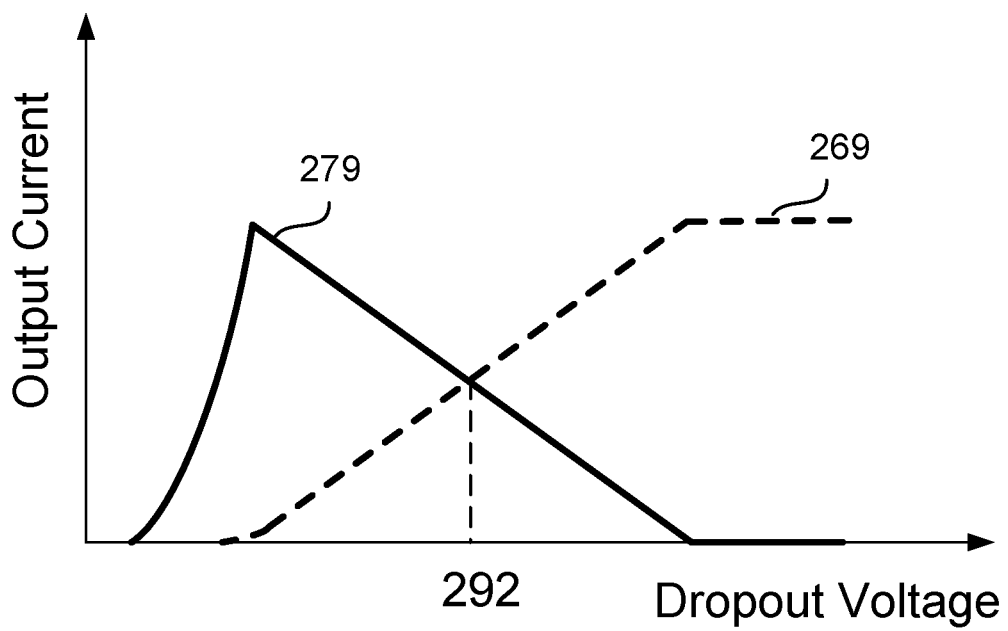

FIG. 2D shows an example of a current distribution of the first current path I1 and a second current path I2 of the LED driving circuit 100 as shown in FIG. 1 in accordance with yet another embodiment of the present disclosure. As shown in FIG. 2D, the x-axis of FIG. 2D x-axis the dropout voltage (the voltage across the pin P1 and the pin P3) and the y-axis represents the output current, where the curve 269 shows the current flowing through the first current path I1, and the curve 279 shows the current flowing through the second current path I2. When the dropout voltage is greater than a threshold 292, most of the LED current will flow through the first current path I1 via the heat dissipation resistor $R_{TH}$.

It should be noted that although the current distribution of the first current path I1 and a second current path I2 as shown in FIGS. 2A-2C are linear regulated, the present disclosure is not limited thereto. The current distribution of the current distribution of the first current path I1 and a second current path I2 may be increased or decreased non-linearly. Although the x-axis of FIGS. 2A-2D represent the input voltage and the dropout voltage, it should be noted that the current distribution of the first current path I1 and a second current path I2 could be adjusted according to other factors. For instance, the current distributions of the first current path I1 and a second current path I2 as shown in FIGS. 2A-2D with the x-axis representing the voltage across the first current source, the voltage across the second current source, and/or the voltage across the heat dissipation resistor $R_{TH}$.

Figure 3:
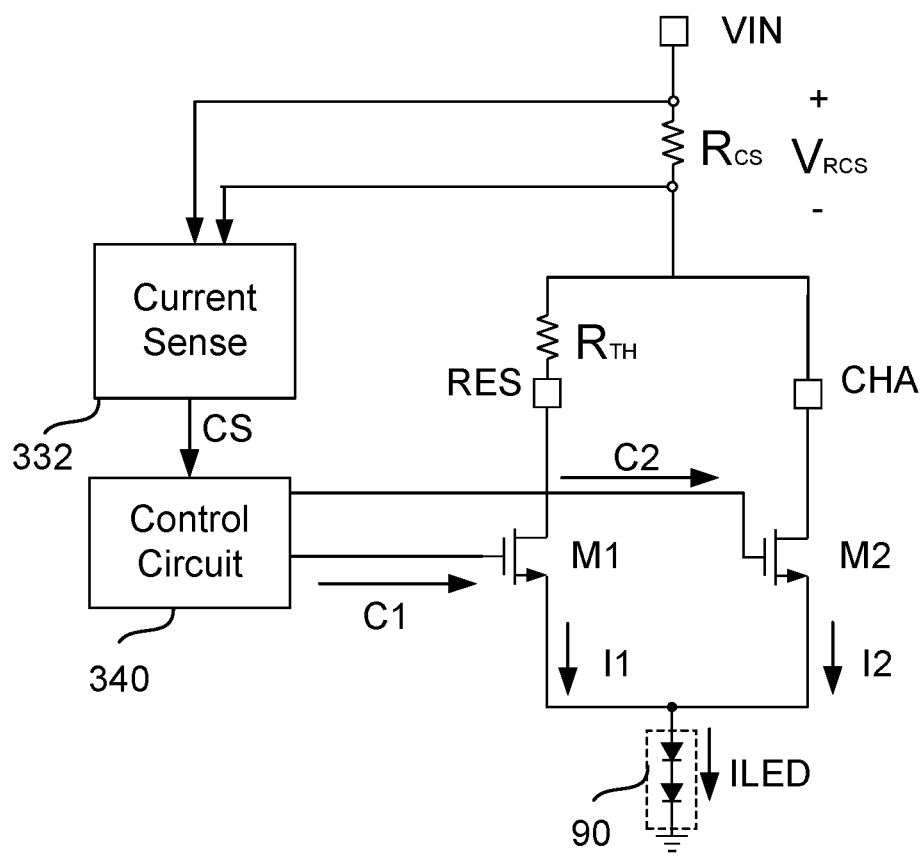
FIG. 3 is a schematic block diagram of an LED driving circuit for driving an LED string in accordance with another embodiment of the present disclosure.

FIG. 3 is a schematic block diagram of an LED driving circuit 300 for driving an LED string 90 in accordance with another embodiment of the present disclosure. In this embodiment, the first current source 110 includes a switch M1. As shown in FIG. 3, the control terminal of the switch M1 is configured to receive a first control signal C1 from the control circuit 340, and the first terminal of the switch M1 is coupled to a first terminal of the heat dissipation resistor $R_{TH}$ (e.g., at pin RES). Similarly, the second current source 120 includes a switch M2. The control terminal of the switch M2 is configured to receive a second control signal C2 from the control circuit 340, and the first terminal of the switch M2 is coupled to a second terminal of the heat dissipation resistor $R_{TH}$ (e.g., at pin CHA). For example, the switch M1/M2 may be a transistor, e.g., a Bipolar Junction Transistor (BJT), a Metal-Oxide-Semiconductor Field-Effect Transistor (MOSFET), an Insulated-Gate Bipolar Transistor (IGBT), a Junction Gate Field-Effect Transistor (JFET), or other controllable switches. In one embodiment, the switch M1/M2 is an NMOS having a source terminal, a drain terminal and a gate terminal.

In one embodiment, a current sense resistor $R_{CS}$ is used to obtain the current sense signal CS. Specifically, the current sense resistor $R_{CS}$ is coupled in series with the LED string 90. In one embodiment, the first terminal of the current sense resistor $R_{CS}$ is coupled to the heat dissipation resistor $R_{TH}$ and the second current source (e.g., at pin CHA), and the second terminal of the current sense resistor $R_{CS}$ is coupled to the pin VIN. The current flowing through the LED string could be obtained by detecting the voltage (e.g., $V_{RCS}$) across the current sense resistor $R_{CS}$. In one implementation, the current sense signal CS is the fixed fraction of the voltage across the current sense resistor $R_{CS}$ (e.g., $V_{RCS}$=CS/5). As shown in FIG. 3, the current flowing through the LED string is the sum of the current flowing through the first current path I1 and the current flowing through the second current path I2.

After the current sense signal is detected, the control circuit 340 determines the current distribution of the first current path I1 and the second current path I2 in response to the current sense signal CS. Accordingly, the control circuit 340 provides the first control signal C1 to the control terminal (e.g., gate) of the switch M1 to regulate the current flowing through the first current path I1, and provides the second control signal C2 to the control terminal (e.g., gate) of the switch M2 to regulate the current flowing through the first current path I2.

In one embodiment, when the input voltage from the pin VIN is high (e.g., greater than or equal to a reference voltage), the control circuit 340 regulates the LED current by turning on M1 and turning off M2. As a result, the current flows through the heat dissipation resistor $R_{TH}$ to solve the thermal problem of the IC.

On the other hand, when the input voltage from the pin VIN is low (e.g., less than a reference voltage), the voltage across the switch M1 is less than a voltage threshold (e.g., $V_{DS}<V_{DS(SAT)}$), and the current flowing through the first current path I1 is limited by the external resistor $R_{TH}$ and thus is lower than the target value for driving the LED string 90. In this case, the control circuit 340 starts regulating the LED current by turning on the switch M2 to provide the current to the LED string 90 via the second current path I2.

In another embodiment, when the input voltage is extremely low, most of the LED current will flow through the second current path I2 (via CHA pin). As the input voltage rises, the first current path I1 (via RES pin) will generate and gradually increase current to reduce the heat and loss on the IC via the external heat dissipation resistor $R_{TH}$. In the end, when the voltage across the switch M1 is greater than the voltage threshold (e.g., $V_{DS}>V_{DS(SAT)}$), most of the LED current will flow through the current path I1 (via RES pin).

Figure 4A:
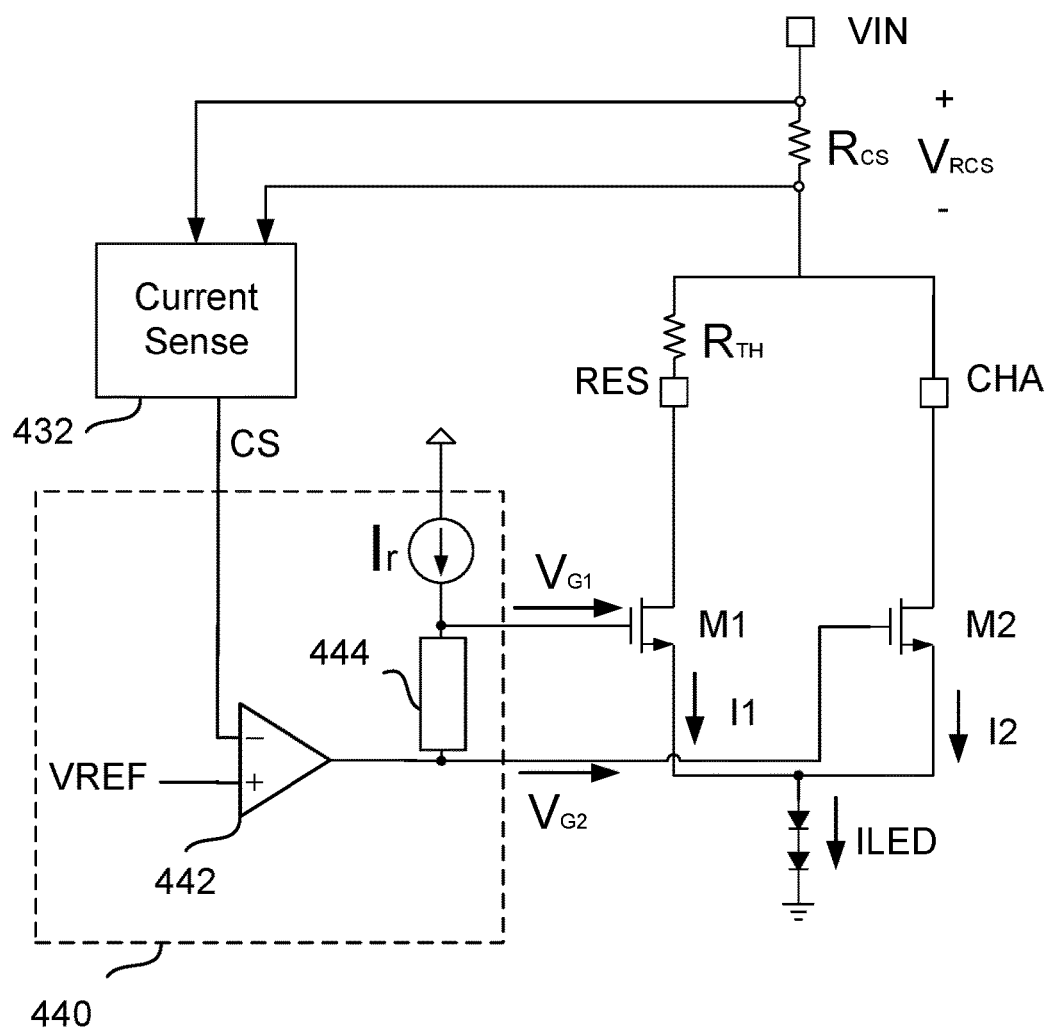
FIG. 4A is a schematic circuit diagram of a control circuit of an LED driving circuit in accordance with an embodiment of the present disclosure.

FIG. 4A is a schematic circuit diagram of a control circuit 440 of an LED driving circuit 400 in accordance with an embodiment of the present disclosure. In this embodiment, the control circuit includes an error amplifier 442, a reference current source $I_r$, and a drop element 444. The error amplifier 442 is configured to receive the current sense signal CS and a reference VREF, and provide an error signal to the drop element 444 in response to the current sense signal CS and the reference VREF. In one embodiment, the reference VREF is configured to adjust the LED current ILED by an external resistor on the ICTRL pin (not shown). The error amplifier 442 is configured to receive the $V_{RCS}$ and the reference VREF to provide the error signal to regulate the LED current ILED.

In one embodiment, the error signal is a current signal. The drop element 444 is coupled between the reference current source $I_r$ and the output terminal of the error amplifier 442. Specifically, the first terminal of the drop element 444 is coupled to the reference current source $I_r$ and the control terminal of the switch M1, and the second terminal of the drop element 444 is coupled to the output terminal of the error amplifier 442 and the control terminal of the switch M2.

When the input voltage is low, the current flowing through the first current path I1 is limited by the external resistor $R_{TH}$ and the dropout voltage of the switch M1 is less than a voltage threshold (e.g., $V_{DS}<V_{DS(SAT)}$), and thus the voltage (e.g., $V_{RCS}$) across the current sense resistor $R_{CS}$ decreases, and is lower than the reference VREF. When the current sense signal CS is lower than the reference VREF, the error signal is at a high voltage level to turn on the switch M1 and the switch M2 to supply the current to the LED strings via both the first current path I1 and the second current path I2. Since the dropout voltage of the switch M1 is less than a voltage threshold (e.g., $V_{DS}<V_{DS(SAT)}$), the current flowing through the second current path I2 (e.g., switch M2) is greater than the current flowing through the first current path I1 (e.g., switch M1).

As the dropout of the switch M1 increases, the current sense signal CS ($V_{RCS}$) increases, the error signal is at a low voltage level. Therefore, most of the current flows through the external heat dissipation resistor $R_{TH}$ (i.e., the first current path I1) increases, and the current flows through the second current path I2 decreases. Since the voltage level of the first control signal $V_{G1}$ is greater than the voltage level of the second control signal $V_{G2}$, the current flowing through the first current path I1 (e.g., switch M1) is greater than the current flowing through the second current path I2 (e.g., switch M2). When the current sense signal CS ($V_{RCS}$) reaches the reference VREF, the error signal is at a low voltage level to turn off the switch M2.

Figure 4B:
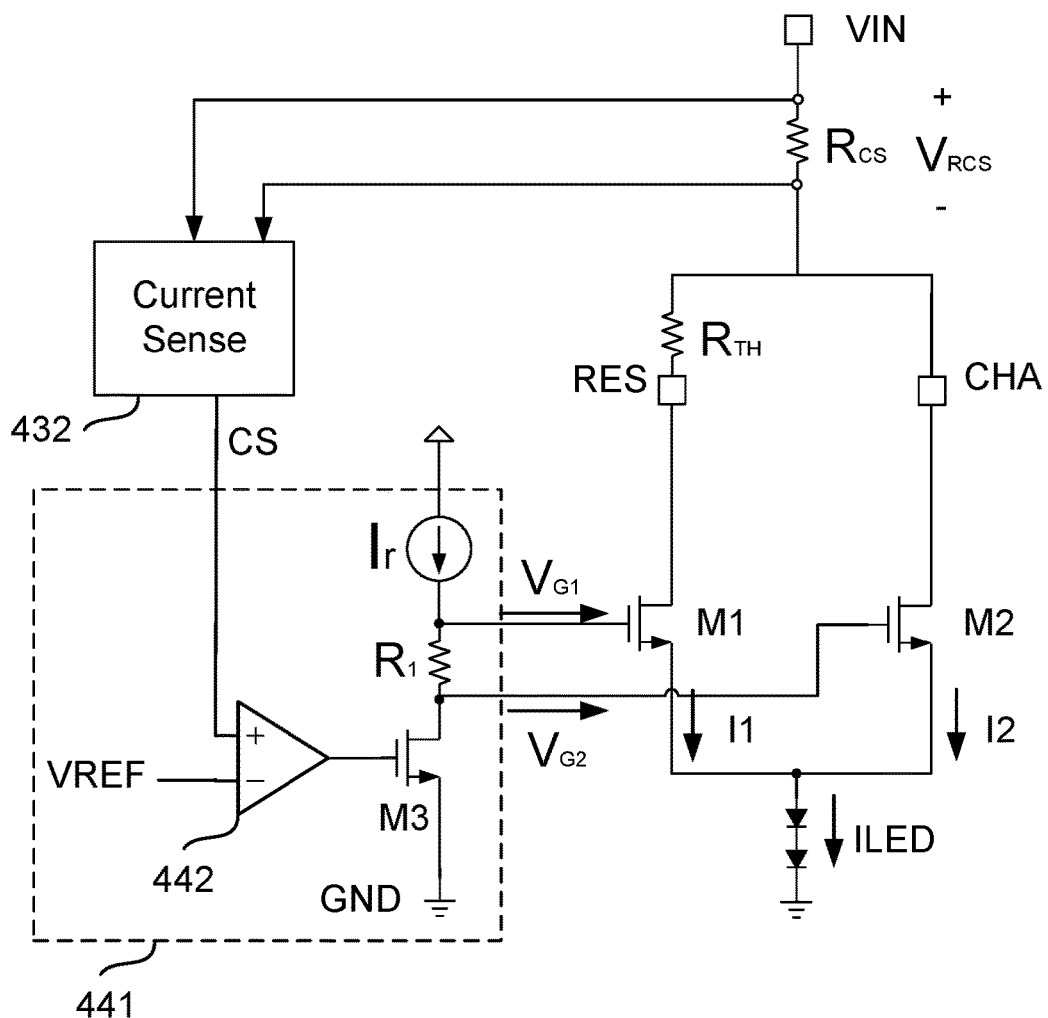
FIG. 4B is a schematic circuit diagram of a control circuit of an LED driving circuit in accordance with another embodiment of the present disclosure.

FIG. 4B is a schematic circuit diagram of a control circuit 441 of an LED driving circuit 402 in accordance with another embodiment of the present disclosure. In this embodiment, the control circuit includes an error amplifier

442, a reference current source $I_r$, a resistor $R_1$ and a switch M3. The error amplifier 442 is configured to receive the current sense signal CS and a reference VREF, and provide an error signal to the control terminal of the switch M3 in response to the current sense signal CS and the reference VREF.

In this embodiment, the first terminal of the switch M3 is coupled to the control terminal of the switch M2. The second terminal of the third switch M3 is coupled to a reference voltage level (e.g., GND).

The reference current source $I_r$ is configured to provide a reference current. The resistor having a first terminal and a second terminal, where the first terminal of the resistor $R_1$ is coupled to the reference current source $I_r$ and the control terminal of the switch M1, and the second terminal of the resistor $R_1$ is coupled to the first terminal of the switch M3 and the control terminal of the switch M2.

When the input voltage is low, the current flowing through the first current path I1 is limited by the external resistor $R_{TH}$ and the dropout voltage of the switch M1 is less than a voltage threshold (e.g., $V_{DS}<V_{DS(SAT)}$), and thus the voltage (e.g., $V_{RCS}$) across the current sense resistor $R_{CS}$ is lower than the reference VREF. When the current sense signal CS is lower than the reference VREF, the error signal is at a low voltage level to turn off M3, and thus the voltage level of the second control signal $V_{G2}$ starts turning on the NMOS M2, and also the voltage level of the second control signal $V_{G1}$ starts turning on the NMOS M1. Thus, the current flows through the NMOS M1 and NMOS M2 to the LED string. That is, when the input voltage is low and the LED current is lower than the target value, the switch M2 is turned on to supply the current to the LED strings. As the voltage (e.g., $V_{RCS}$) across the current sense resistor $R_{CS}$ increases, the voltage level of the second control signal $V_{G2}$ decreases, and thus the current flows through the NMOS M2 decreases.

When the dropout of the switch M1 is greater than the voltage threshold, the current sense signal CS is greater than the reference VREF, the error signal is at a high voltage level to turn on M3, and thus a low voltage level of the second control signal $V_{G2}$ is provided to the gate of the NMOS M2 to turn off the NMOS M2, and thus no current is flowing through the second current path I2. Meanwhile, a high voltage level of the first control signal $V_{G1}$ is provided to the gate of the NMOS M1 to turn on the NMOS M1, and thus the current flows through the external heat dissipation resistor $R_{TH}$ to the LED string.

Figure 5:
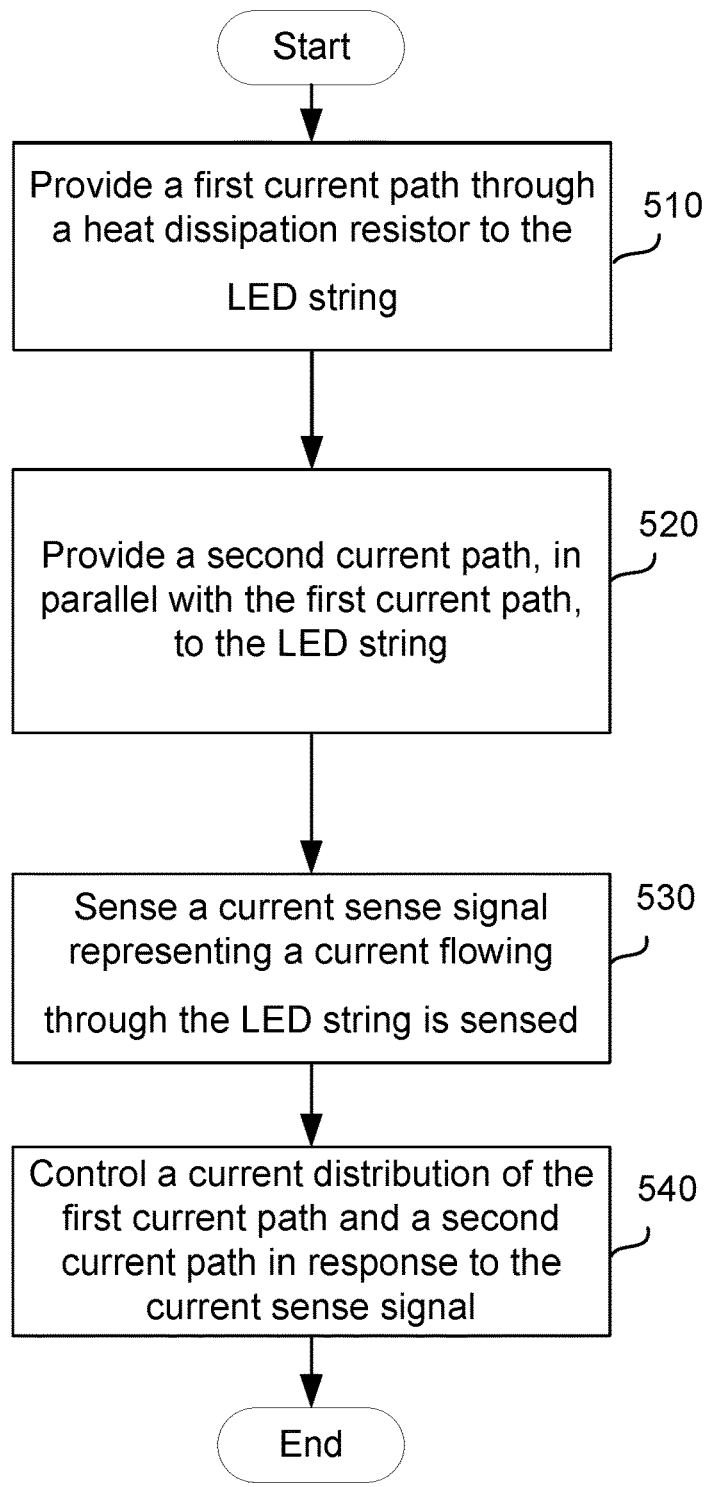
FIG. 5 is a flowchart of a method for driving an LED string in accordance with an embodiment of the present disclosure.

FIG. 5 is a flowchart of a method 500 for driving an LED string in accordance with an embodiment of the present disclosure. The method 500 may be performed by the LED driving circuits 100, 300, 400 as shown in FIGS. 1, and 3-4. The method includes the following actions. In action 510, a first current path to the LED string is provided through a heat dissipation resistor. In action 520, a second current path, in parallel with the first current path, to the LED string is provided. In action 530, a current sense signal representing a current flowing through the LED string is sensed, where the current flowing through the LED string is supplied by the first current path and the second current path. In action 540, a current distribution of the first current path and a second current path is controlled in response to the current sense signal.

In one embodiment, when the current sense signal is greater than a threshold, a current flowing through the first current path is larger than a current flowing through the second current path; and when the current sense signal is less than the threshold, the current flowing through the first current path is less than the current flowing through the second current path.

Although the flowchart of FIG. 5 shows a sequential action. It is obvious to persons skilled the art that these actions could be performed in any order.

Figure 6:
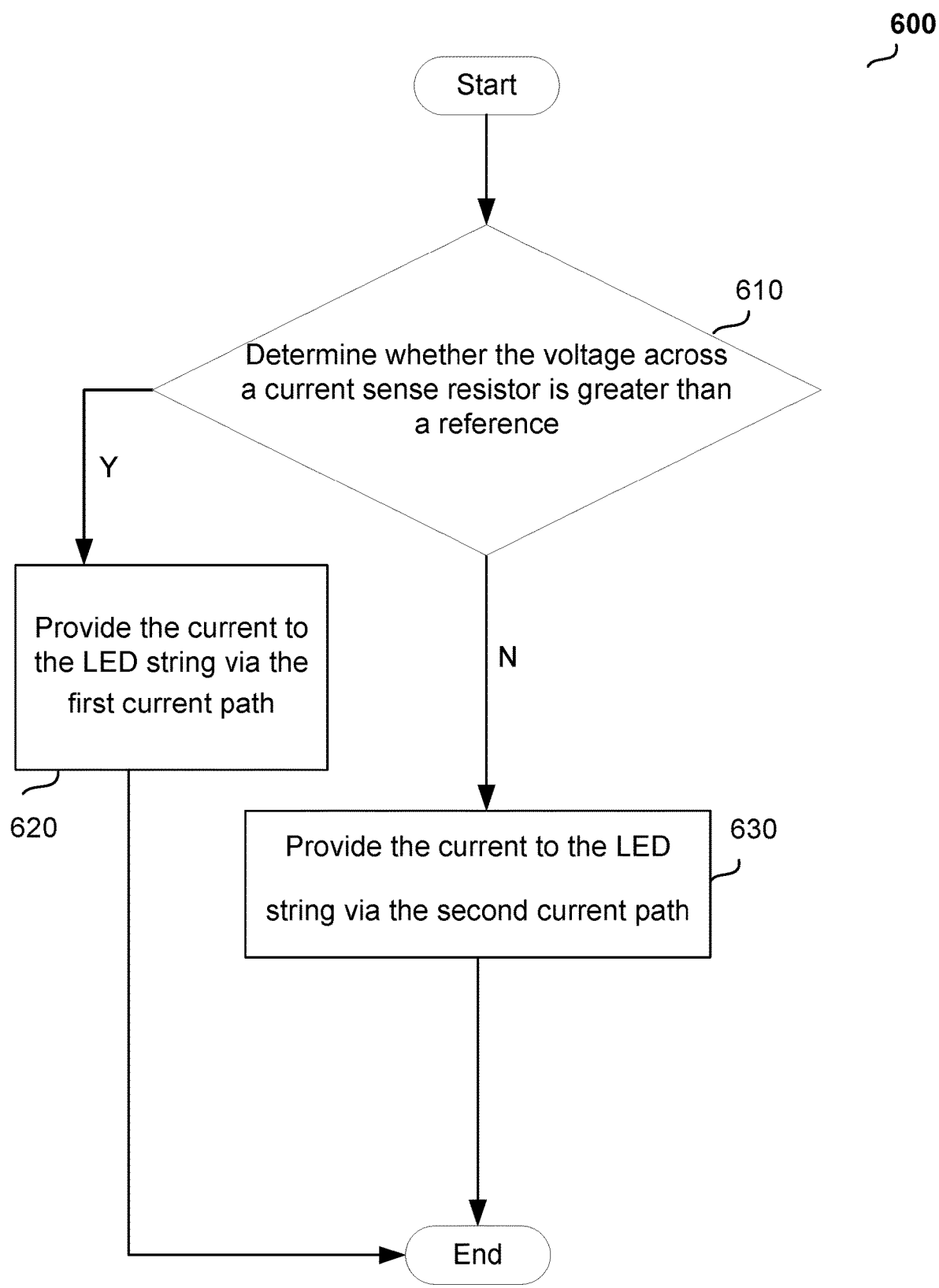
FIG. 6 is a flowchart of a method for driving an LED string in accordance with another embodiment of the present disclosure.

FIG. 6 is a flowchart of a method 600 for driving an LED string in accordance with another embodiment of the present disclosure. The method 600 may be performed by the LED driving circuits 100, 300, 400 as shown in FIGS. 1, and 3, 4A and 4B. The method includes the following actions. When the dropout voltage of a first switch is less than a voltage threshold, action 610 is performed. In action 610, whether the voltage across a current sense resistor is greater than a reference (e.g., VREF) is determined. If yes, the action 620 is performed. In action 620, a second switch is turned off, and a first switch is turned on to provide the current to the LED string via the first current path.

In one embodiment, when the voltage across the current sense resistor is greater than a voltage threshold, the current flowing through the first current path is greater than the current flowing through the second current path. When the voltage across the current sense resistor is much higher (e.g., greater than a first threshold), a second switch is turned off, and the current flowing through the LED string is provided only via the first current path. In one implementation, the first threshold is determined by the dropout voltage, i.e., the voltage across the first current path, for example, $V_{DS}$ of the switch M1 as shown in FIG. 3.

On the other hand, when the voltage across the current sense resistor is not greater than the reference, action 630 is performed. In action 630, the second switch is turned on to provide the current flowing through the LED string via the second current path. For instance, when the voltage across the first switch is not greater than the reference, a first switch and a second switch are both turned on to provide the current to the LED string via the first current path and the second current path.

In some embodiments, when the voltage across the current sense resistor is much lower than the reference (e.g., less than a second threshold), a first switch is turned off and the second switch is turned on to provide the current to the LED string only via the second current path. In one implementation, the second threshold is determined by the dropout voltage, i.e., the voltage across the first current path, for example, $V_{DS}$ of the switch M1 as shown in FIG. 3.

Based on the above, the present disclosure provides various LED driving circuits for driving an LED string with multiple current paths. As a result, the LED driving circuit solves thermal problem of the IC via an external resistor and also provides the target LED current for a wide range of input voltage.

It will be appreciated by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A Light Emitting Diode (LED) driving circuit for driving an LED string, comprising:
    a first current source coupled in series with a heat dissipation resistor, wherein the first current source is configured to provide a first current path to the LED string;

a second current source coupled in parallel with the serially coupled first current source and the heat dissipation resistor, wherein the second current source is configured to provide a second current path to the LED string;

a current sensing circuit configured to sense a current sense signal representing a current flowing through the LED string, wherein the current flowing through the LED string is supplied by the first current path and the second current path; and a control circuit configured to receive the current sense signal, and control a current distribution of the first current path and a second current path in response to the current sense signal;

wherein when the current sense signal is greater than a threshold, a current flowing through the first current path is larger than a current flowing through the second current path; and wherein when the current sense signal is less than the threshold, the current flowing through the first current path is less than the current flowing through the second current path.

2. The LED driving circuit of claim 1, wherein the first current source comprises:

a first switch having a first terminal, a second terminal, and a control terminal, wherein the control terminal of the first switch is configured to receive a first control signal from the control circuit, and the first terminal of the first switch is coupled to a first terminal of the heat dissipation resistor;

and wherein the second current source comprises:

a second switch having a first terminal, a second terminal, and a control terminal, wherein the control terminal of the second switch is configured to receive a second control signal from the control circuit, and the first terminal of the second switch is coupled to a second terminal of the heat dissipation resistor.

3. The LED driving circuit of claim 2, wherein when a voltage across the first switch is less than a voltage threshold, the second switch is turned on.

4. The LED driving circuit of claim 2, wherein when a voltage across the first switch is greater than or equal to a voltage threshold, the current flowing through the first current path is greater than the current flowing through the second current path.

5. The LED driving circuit of claim 2, wherein the control circuit comprises:

an error amplifier configured to receive the current sense signal and a reference signal, and provide an error signal in response to the current sense signal and the reference signal;

a reference current source; and a drop element having a first terminal and a second terminal, wherein the first terminal of the drop element is coupled to the reference current source and the control terminal of the first switch, and the second terminal of the drop element is configured to receive the error signal, and the second terminal of the drop element is coupled to the control terminal of the second switch.

6. The LED driving circuit of claim 5, wherein the control circuit further comprises:

a third switch having a first terminal, a second terminal, and a control terminal, wherein the control terminal of the third switch is configured to receive the error signal, the first terminal of the third switch is coupled to the control terminal of the second switch and the second terminal of the drop element, and the second terminal of the third switch is coupled to a reference voltage level.

7. The LED driving circuit of claim 1, wherein a current sense resistor is coupled in series with the LED string, wherein the current sense signal is obtained by detecting a voltage across the current sense resistor, and the current flowing through the LED string is a sum of the current flowing through the first current path and the current flowing through the second current path.

8. A method for driving an LED string, comprising:

providing a first current path through a heat dissipation resistor to the LED string;

providing a second current path, in parallel with the first current path, to the LED string;

sensing a current sense signal representing a current flowing through the LED string, wherein the current flowing through the LED string is supplied by the first current path and the second current path;

controlling a current distribution of the first current path and a second current path in response to the current sense signal;

wherein when the current sense signal is greater than a threshold, a current flowing through the first current path is larger than a current flowing through the second current path; and wherein when the current sense signal is less than the threshold, the current flowing through the first current path is less than the current flowing through the second current path.

9. The method of claim 8, wherein the step of providing the first current path through the heat dissipation resistor to the LED string further comprises:

providing a first switch coupled in series with the heat dissipation resistor; and receiving a first control signal via a control terminal of the first switch;

wherein when the first switch is turned on in response to the first control signal, the current flowing through the first switch is provided to the LED string.

10. The method of claim 9, wherein the step of providing the second current path to the LED string further comprises:

providing a second switch coupled in parallel with the serially coupled first switch and the heat dissipation resistor; and receiving a second control signal via a control terminal of the second switch;

wherein when the second switch is turned on in response to the second control signal, the current flowing through the second switch is provided to the LED string.

11. The method of claim 10, wherein when a voltage across the first switch is less than a voltage threshold, the second switch is turned on.

12. The method of claim 10, wherein when a voltage across the first switch is greater than or equal to a voltage threshold, the current flowing through the first current path is greater than the current flowing through the second current path.

13. The method of claim 10, further comprising:

receiving the current sense signal and a reference signal;

providing an error signal, by an error amplifier, in response to the current sense signal and the reference signal;

providing a drop element coupled between a reference current source and an output terminal of the error amplifier, wherein a first terminal of the drop element is coupled to the reference current source and the control terminal of the first switch, and a second terminal of the drop element is coupled to the output terminal of the error amplifier and the control terminal of the second switch.

14. The method of claim 13, further comprising:
providing a third switch coupled between a reference voltage level and the second terminal of the drop element, wherein a control terminal of the third switch is configured to receive the error signal, a first terminal of the third switch is coupled to the control terminal of the second switch and the second terminal of the drop element, and a second terminal of the third switch is coupled to the reference voltage level.

15. The method of claim 9, wherein the current sense signal is obtained by detecting a voltage across a current sense resistor coupled in series with the LED string, and the current flowing through the LED string is a sum of the current flowing through the first current path and the current flowing through the second current path.

16. An LED driving circuit for driving an LED string, comprising:
a first switch coupled in series with a heat dissipation resistor, wherein the first switch is configured to provide a first current path to the LED string;
a second switch coupled in parallel with the serially coupled first switch and the heat dissipation resistor, wherein the second switch is configured to provide a second current path to the LED string, and a current flowing through the LED string is supplied by the first current path and the second current path;
a current sensing circuit configured to detect a voltage across a current sense resistor, wherein the current sense resistor is coupled in series with the LED string; and
a control circuit configured to receive the voltage across the current sense resistor, and provide a first control signal to a control terminal of the first switch and a second control signal to a control terminal of the second switch in response to the voltage across the current sense resistor;
wherein when the voltage across the current sense resistor is not greater than a reference signal, the second switch is turned on to provide the current flowing through the LED string via the second current path.

17. The LED driving circuit of claim 16, wherein when the voltage across the current sense resistor is greater than the reference signal, the second switch is turned off, and the current flowing through the LED string is provided via the first current path.

18. The LED driving circuit of claim 17, wherein when a voltage across the first switch is greater than a voltage threshold, the current flowing through the first current path is greater than the current flowing through the second current path.

19. The LED driving circuit of claim 16, wherein when a voltage across the first switch is not greater than a voltage threshold, the second switch is turned on to provide the current flowing through the LED string via the second current path.

* * * * *